Figure 1:
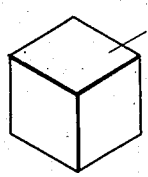
Figure 2:
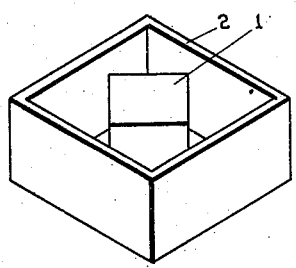
Figure 3:
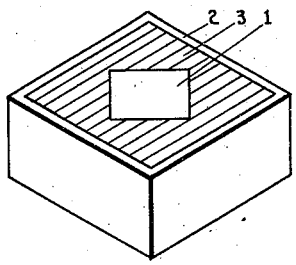
Figure 4:
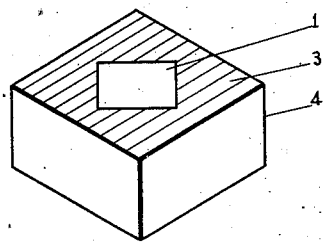
Figure 5:
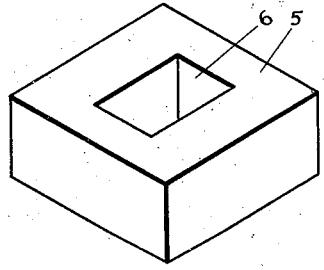
Figure 6:
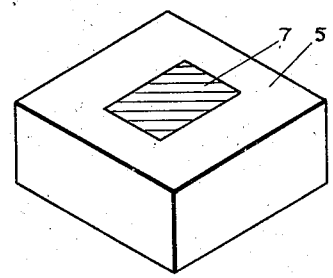
Figure 7:
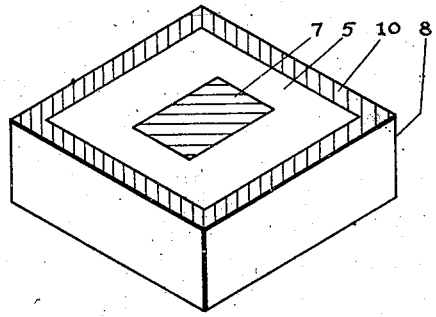
Figure 8:
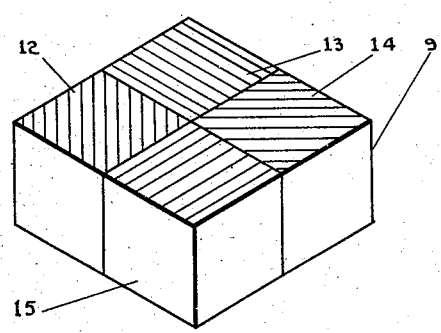

Oct. 14, 1947.    J. R. MARES    2,428,977

PROCESS FOR PRODUCING DECORATIVE ARTICLES

Filed April 17, 1945

JOSEPH R. MARES
INVENTOR

BY Reuben Schmidt
ATTORNEY

Patented Oct. 14, 1947

2,428,977

UNITED STATES PATENT OFFICE 2,428,977

PROCESS FOR PRODUCING DECORATIVE ARTICLES

Joseph R. Mares, Webster Groves, Mo., assignor to Monsanto Chemical Company, St. Louis, Mo., a corporation of Delaware Application April 17, 1945, Serial No. 588,793

6 Claims. (Cl. 18—58)

This invention relates to decorative articles made from thermosetting casting resins. More particularly, the invention relates to vari-colored cast resin articles.

Prior methods of preparing vari-colored infusible, insoluble cast resin articles have tended to be cumbersome and to lead to unsatisfactory results.

Thus, prior attempts to prepare vari-colored articles have resulted in products that are lacking either in the delineation of the color design, or in articles in which the contrastingly colored portions have not been integrally united and have tended to separate on ageing.

It is an object of this invention to provide a new method for preparing decorative articles from thermosetting casting resins. Another object is to provide improved vari-colored cast resin articles which have a relatively sharp delineation of design.

These and other objects are attained by forming a preliminary casting of fusible, thermosetting resin of the desired color and congealing the casting so formed by cooling. The congealed preliminary casting is then positioned in a mold of the desired shape and configuration and the area unfilled by the preliminary casting is filled with additional fusible, thermosetting casting resin having a different color from that of the preliminary casting. The composite casting thus formed is hardened to an insoluble, infusible state by the application of heat.

In contrast to prior processes, the process of this invention makes possible the production of articles having varied and sharply delineated color patterns as an integral part of the articles.

The accompanying drawings illustrate different methods of applying the process of this invention to the production of decorative cast resin articles.

Figure I is a perspective view of an article cast from a thermosetting resin and congealed by cooling.

Figure II is perspective view of the congealed article of Figure I positioned within a rectangular mold.

Figure III is a perspective view of the congealed article of Figure I positioned in the rectangular mold shown in Figure II, the remaining portions of the mold being filled with a casting resin of contrasting color.

Figure IV is a perspective view of the finished article made by curing the composite shown in Figure III.

Figure V is a perspective view of a congealed block of a fusible cast resin having a rectangular hole located in the center of the block.

Figure VI is a perspective view of a finished article made by filling the rectangular hole of the block shown in Figure V with a resin of a contrasting color and then curing the composite product confined in a suitable mold.

Figure VII is a perspective view of a finished article made by casting a third resin around the two resins shown in Figure VI before curing the composite.

Figure VIII is a perspective view of a finished article made from four congealed rectangular blocks of a fusible thermosetting resin, each of a different color, and cured together in a suitable mold.

Referring to the drawings, 1 is a congealed block of thermosetting casting resin made by casting such a resin in a mold, congealing the resin while still fusible and removing it from the mold. The congealed block 1 is then placed in a suitable mold 2 which is of different dimensions than those of block 1. Mold 2 is then filled with a thermosetting casting resin, 3, the color of which contrasts with that of block 1. The composite is then cured to an insoluble, infusible state and the mold removed to obtain finished article 4.

In another embodiment of this invention a block, 5, of thermosetting casting resin containing a hole, 6, rectangular in cross section, is made by casting the resin in a suitable mold and congealing the resin by cooling it. The hole, 6, is then filled with a thermosetting casting resin, 7, of a color contrasting with that of block 5. The composite may be cured immediately to obtain a bi-colored article.

Alternatively the congealed block 5 containing congealed section 7 may be placed in a mold having substantially different dimensions and additional thermosetting casting resin 10 of a color contrasting with that of block 5 and the same as or contrasting to that of section 7 poured into the mold. The whole may then be cured at an elevated temperature to obtain article 8 having integral sections of contrasting color 5, 7 and 10.

A further embodiment of the invention is illustrated in Figure VIII in which an article 9 is shown made by positioning four sections 12, 13, 14, and 15 of congealed thermosetting casting resin, each one of which being colored in contrast to each of the others in a mold having substantially the same dimensions as the assembled sections and curing the sections at an elevated temperature to obtain an integral article of vari-colored design.

For convenience in illustrating this invention all of the articles shown are hexahedrons. It is obvious that the various sections and the finished articles may be made in any desired shape either symmetrical or asymmetrical.

Any casting resins of the thermosetting type may be used in forming articles by the process of this invention. Examples of such casting resins include phenol aldehyde, urea aldehyde, melamine aldehyde condensation products and the like. Such resins are well known to those skilled in the art and are usually syrupy liquids at the temperature of casting which is usually about 60–90° C. Examples of phenol-formaldehyde resins of this type and methods of making them are disclosed in U. S. Reissue Patents 19,708 and 19,710 and in U. S. Patent 2,321,783.

The various sections making up the composite articles may be of different resins. For example, in Figure VIII blocks 12 and 14 may be made of a urea-formaldehyde casting resin and blocks 13 and 15 may be made of a phenol formaldehyde casting resins.

According to one embodiment of this invention the syrup is poured into a preliminary mold and then cooled while still fusible until it is solidified. The solidified or congealed syrup is then removed from the mold. It may be placed within another mold immediately, or it may be stored under congealing conditions until needed, or subjected to mechanical treatment to obtain a desired configuration before being positioned in another mold. Thus, it may be sliced or cut into sheets of varying thickness, drilled, sawed or a pattern may be cut from the congealed piece by the use of a stamping die.

When the congealed article has been formed into the desired shape, it is positioned within a mold and the mold is filled with a syrup of a different color. If desired, the resulting product may be congealed, placed in still another mold and a third syrup of a color contrasting with that of the resin contiguous to it in the final article cast into the mold. When the desired configuration has been attained, the entire composite is heated to complete the resinification of the syrups and produce a decorative article in which the component parts have become integrated into a single resinous material.

An alternative method for producing the decorative articles of this invention is to congeal a plurality of shapes of contrasting colors, place them together in a mold and harden them by heating.

The temperature to which it is necessary to cool the syrups to congeal them varies according to the nature of the casting resin, but is generally at or below 0° C. The temperature of the congealed resin must be maintained sufficiently low to prevent substantial cold flow which would distort the outline of the design until such time as the design is completed and the final hardening of the composite article is effected.

In the process of hardening the composite article by the application of heat, substantially no diffusion from one portion to the next occurs and the boundaries between the contrasting colors are sharply delineated.

The excellent results obtained by the present process are due largely to the fact that the congealed shapes are made of fusible resins of substantially the same degree of reactivity as the subsequently added resin or resins. When the composite article is hardened to its final infusible form, it is characterized by homogeneous composition, firm union between its several parts, and well defined boundaries between contrasting colors and designs. If desired, the finally hardened composite may be turned or otherwise machined to suitable shape without separation of the integral parts. By shaping the surface of the molds or by machining, it is possible to obtain cameo-like or other embossed effects.

The process of this invention is particularly suited to the preparation of pleasing decorative designs for articles such as pendants, watch charms, napkin rings, vanity cases, cigar holders, umbrella handles, clock cases, radio cabinets, etc.

A particular advantage of the process is that a multiplicity of colored shapes may be cast, congealed and then stored at congealing temperatures until needed for the production of desired designs.

The above description is intended to be illustrative and not limitative of the invention as set forth in the appended claims.

What is claimed is:

1. A process for producing decorative articles from thermosetting casting resin syrups which comprises casting a preliminary section, congealing said section by cooling it to at least 0° C. while it is still fusible, positioning said section in a mold, filling the mold with additional thermosetting resin syrup of a contrasting color and heating the composite mass to advance the resin to an infusible state.

2. A process for producing decorative articles from thermosetting casting resin syrups which comprises separately casting a plurality of preliminary sections each of a different color, congealing the sections by cooling them to at least 0° C. while still fusible, positioning said sections in a mold and heating the composite to advance the resin to an infusible state.

3. A process for producing decorative articles from thermosetting casting resin syrups which comprises casting a plurality of preliminary sections each of a different color, congealing the sections by cooling them to at least 0° C. while still fusible, positioning said sections in a mold, filling the mold with additional thermosetting resin syrup of a contrasting color and heating the composite to advance the resin to an infusible state.

4. A process for producing decorative articles from phenol formaldehyde casting resin syrups which comprises casting a preliminary section, congealing said section by cooling to at least 0° C. while it is still fusible, positioning said section in a mold, filling the mold with additional phenol formaldehyde resin syrup of a contrasting color, and heating the composite mass to advance the resin to an infusible state.

5. A process for producing decorative articles from phenol formaldehyde casting resin syrups which comprises casting a plurality of preliminary sections, each of a different color, congealing the sections by cooling them to at least 0° C. while still fusible, positioning said sections in a mold and heating the composite to advance the resin to an infusible state.

6. A process for producing decorative articles from phenol formaldehyde casting resin syrups which comprises casting a plurality of preliminary sections each of a different color, congealing the sections by cooling them to at least 0° C. while still fusible, positioning said sections in a mold, filling the mold with additional phenol formaldehyde resin syrup of a contrasting color, and heating the composite to advance the resin to an infusible state.

JOSEPH R. MARES.

REFERENCES CITED

The following references are of record in the file of this patent:

UNITED STATES PATENTS

| Number | Name | Date |
|---|---|---|
| 1,764,694 | Serota | June 17, 1930 |
| 2,062,880 | Hansen | Dec. 1, 1936 |
| 2,075,340 | Cserny | Mar. 30, 1937 |
| 2,086,493 | Ellingwood | July 6, 1937 |
| 2,285,963 | Gits et al. | June 9, 1942 |
| 2,358,259 | Siedschlag et al. | Sept. 12, 1944 |